United States Patent [19]

Takashige et al.

[11] Patent Number: 4,734,245
[45] Date of Patent: Mar. 29, 1988

[54] METHOD OF PRODUCING BIAXIALLY ORIENTED FILM OF THERMOPLASTIC RESIN

[75] Inventors: Masao Takashige; Hidenobu Takeichi; Takeo Hayashi, all of Chiba, Japan

[73] Assignee: Idemitsu Petrochemical Co., Ltd., Tokyo, Japan

[21] Appl. No.: 823,547

[22] Filed: Jan. 29, 1986

[30] Foreign Application Priority Data

Jan. 30, 1985 [JP] Japan .................................. 60-17637
Jan. 30, 1985 [JP] Japan .................................. 60-17638
Jan. 30, 1985 [JP] Japan .................................. 60-17639

[51] Int. Cl.$^4$ ............................................ B29C 55/28
[52] U.S. Cl. ................................ 264/564; 264/209.3; 264/569
[58] Field of Search ............... 264/566, 569, 209.5, 264/210.2, 209.3, 564

[56] References Cited

U.S. PATENT DOCUMENTS 3,325,575 6/1967 Last ................................. 264/209.5
3,492,386 1/1970 Ohmasa et al. ................. 264/566
3,725,519 4/1973 Seifried et al. ................. 264/210.2
3,788,503 1/1974 Hirose et al. ................... 264/209.5
3,880,974 4/1975 Nohtomi et al. ................ 264/569
3,985,849 10/1976 Notomi et al. .................. 264/569

FOREIGN PATENT DOCUMENTS 44-2598 2/1969 Japan .
25920 2/1982 Japan ............................. 264/209.5

Primary Examiner—James Lowe
Attorney, Agent, or Firm—Flynn, Thiel, Boutell & Tanis

[57] ABSTRACT

A method of biaxially stretching a tubular thermoplastic resin to provide a film, wherein air is blown against a starting point for heating and stretching the tube, from the upstream side of the starting point, at a predetermined angle relative to the feeding direction of the film. An apparatus for achieving this method includes: two pairs of nip rolls being different in circumferential speed between the pairs; a heating-stretching section interposed between the pairs of nip rolls, for heating the tube to a temperature where the tube can be stretched; and an air ring device for blowing air in the feeding direction of the film.

15 Claims, 1 Drawing Figure

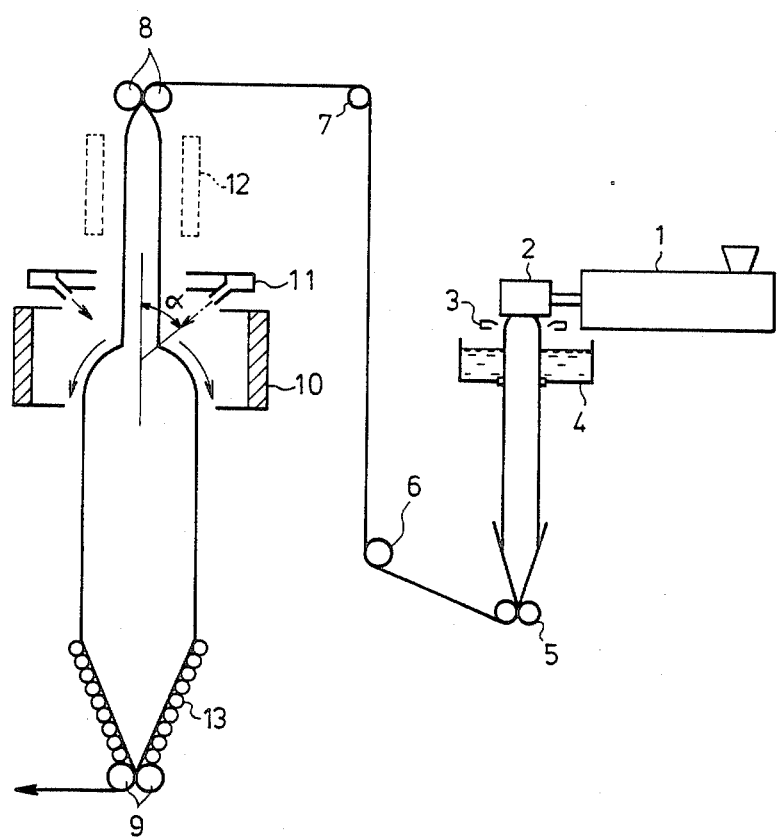

METHOD OF PRODUCING BIAXIALLY ORIENTED FILM OF THERMOPLASTIC RESIN

BACKGROUND OF THE INVENTION

1. Field of the Invention

This invention relates to a method of producing a biaxially oriented film of thermoplastic resin and an apparatus therefor, wherein a tubular thermoplastic resin film is simultaneously stretched in both the longitudinal and transversal directions of the film, and more particularly, is utilized for stabilizing in stretching operation.

2. Description of the Prior Art

As the methods of producing the biaxially oriented film of thermoplastic resin, there have heretofore been well known two methods including a tenter method, and a tubular method, wherein a tubular film is held between two pairs of top and bottom nip rolls, which are different in circumferential speed from each other, the tubular film is heated between these nip rolls to a temperature where the tubular film can be stretched, and gas is delivered into the tubular film, whereby, due to pressure of the gas delivered and the difference in circumferential speed between the two pairs of nip rolls, the tubular film is simultaneously stretched in both the longitudinal and transversal directions.

As for the former tenter method, there have been known a multistage biaxially stretching method and a simultaneously biaxially stretching method. When a polyamide film to be biaxially stretched is produced according to the multistage biaxially stretching method for example, firstly, hydrogen bonding is generated which has a directional property in a direction perpendicular to a direction, in which the film has been stretched initially, and the succeeding orienting in a direction perpendicular to the initial orienting direction tends to become a neck stretching, so that it is very difficult to obtain a uniformly oriented film. Furthermore, when a polyamide film to be biaxially stretched is produced according to the simultaneously biaxially stretching method, a side edge portion of the raw material film is grasped by a grip, thereby presenting such disadvantages that this portion does not contribute to the stretching, which leads to a loss to a considerable extent, whereby the yield is lowered to a great extent, and the manufacturing cost due to the large-sized stretching mechanical equipment, including an increased installation floor area.

According to the tubular method, the longitudinal and transversal stretchings occur simultaneously, and setting and changing of stretching ratios can be easily carried out, so that the tubular method has such great features that a well-balanced film can be obtained and the installation cost is low. On the other hand, in this method, it is most important to uniformly heat the tubular film in a heating-stretching section to stabilize an stretching starting point. However, it is very difficult to secure this. From the above reason, despite the advantage of low installation cost, etc. of the tubular method, in fact, the bulk of the biaxially oriented film manufacturing method continues to belong to the tenter method.

Now, in order to obviate the disadvantage of the tubular method, there has been proposed a method, wherein positions before and behind a stretching zone are shielded with covers, shaking of the tube is avoided by an upward air stream, to thereby preclude the adverse influence of the open air (Japanese Patent Application Publication No. 6834/1964). However, even with this method, particularly, at about a portion of a bubble neck, i.e. about the stretching starting point, the flowrate of air flowing along the film is lowered, and heat transfer performed between the film of this portion and the open air lacks uniformity in the circumferential direction of the tube, so that the temperature distribution in the circumferential direction of the tubular film is extended around the stretching starting point in particular, thus resulting in insufficient stability and uniformity of the stretching.

Therefore, there have been proposed methods, wherein there are provided two air rings which blow air against about this stretching starting point in directions opposite to each other (for example, Japanese Patent Application Publication Nos. 27480/1970, 15439/1971, 47269/1974 and the like). However, in these methods, because two air rings are needed, portions of air blown out of the air rings impinge on each other to cause turbulences in the air streams, air heated beyond a predetermined temperature (for example, 150° C.) is needed, such disadvantages present that an equipment for heating is complicated, heating efficiency is lowered due to a contact conductive heating of air and heating energy is lost by the fact that air heated is incontinent.

Furthermore, there has been proposed a method, wherein a raw material film is previously heated to 50°–90° C., thereafter, atmospheric temperature between an stretching starting point and a stretching ending point is held at 180°–250° C. and the stretching is carried out with a difference in stretching ratio between the longitudinal and transversal directions being maintained at 0.2–0.6 (Japanese Patent Application Publication No. 15914/78). However, according to this method, it is necessary that the raw material film is previously heated and the atmospheric temperature posterior to the stretching starting point is heated as high as to 180°–250° C., and no finesse is reflected in the uniform heating at the orienting starting point and the stabilization of the tubular film before and after the orienting, and hence, these problems have not been solved yet.

Now, out of the thermoplastic resin films, a film made of a saponified material of ethylene-vinyl acetate copolymer (hereinafter referred to as "EVOH") is excellent in gas barrier properties, resistance to oils, antistatic properties and the like, and useful as a packaging material for food products and pharmaceuticals and the like. However, in the biaxial stretching of this EVOH film hydrogen bonding is strong, and the structure tends to be fixed, so that a strong stretching force is needed, and broken film, neck stretching and the like tend to occur. As the result, if the tubular method is used as it is, then an industrially useful and excellent oriented film cannot be obtained.

From this reason, various special methods have been proposed. For example, there have been proposed a method, wherein stretching is performed with a film being closely attached to another film capable of being stretched (Japanese Patent Kokai (Laid-Open) No. 6276/1976), another method, wherein a moisture containing value of an unoriented film is increased, whereby stretching is performed under the specified stretching conditions (Japanese Patent Kokai (Laid-Open) Nos. 88067/1978, 129776/1977 and Patent Application Publication No. 43199/1978) and so forth.

However, in the former method, it is indispensable to use another film. In the latter method, it takes much time to increase the moisture containing value of the EVOH film to 4% or more, and moreover, it is very difficult to control the moisture containing value, so that the latter method cannot be called an established industrially manufacturing method.

From the above reason, there has been proposed a method, wherein an unoriented film having a moisture containing value of 2% or less, which has been obtained by a normal manufacturing of the EVOH film, is previously heated at 50°-70° C. for 5 sec or less, thereafter, rapidly heated to 70°-100° C. by use of heated air, and biaxially stretched (Japanese Patent Kokai (Laid-Open) No. 25920/1982). However, according to this method, previous heating is needed, the film is rapidly heated within a narrow temperature range of 70°-100° C., and moreover, this rapid heating is performed by air-blast, thus presenting such disadvantages that the thermal efficiency is low and the temperature control is difficult to perform.

SUMMARY OF THE INVENTION

An object of the present invention is to provide a method of producing a biaxially oriented film of thermoplastic resin, wherein stability is high during stretching operation and the biaxially oriented film obtained has satisfactory physical properties.

Another object of the present invention is to provide a producing apparatus for working these producing methods very inexpensively and easily.

To this end, the present invention features that, in the producing method, wherein a tubular thermoplastic resin film is fed in one direction while being heated, and the film is simultaneously stretched in both the longitudinal and transversal directions thereof by a tensile force in the feeding direction and internal pressure, air is blown against about the stretching starting point in the heating-stretching zone from the upstream side thereof, at a predetermined angle relative to the feeding direction of the film.

To the above end, the present invention features that the producing apparatus comprises: two pairs of nip rolls for feeding a tubular thermoplastic resin film in one direction while holding the same; a heating-stretching section for heating the film at least to a temperature where the film can be stretched between the nip rolls; and an air ring device for blowing air against about a stretching starting point at a predetermined angle relative to the feeding direction of the film, from the upstream side of the stretching starting point in a heating-stretching zone of the film.

BRIEF DESCRIPTION OF THE DRAWINGS

The drawing is an explanatory view showing one embodiment of the apparatus for producing the thermoplastic biaxially stretching film according to the present invention.

DETAILED DESCRIPTION OF THE PREFERRED EMBODIMENT

Description will hereunder be given of a method and an apparatus according to the present invention. In the accompanying drawing showing one embodiment of the producing apparatus according to the present invention, compressed air is fed to the interior of molten thermoplastic resin extruded in a tubular shape downward from an annular die 2 by an extruder 1. The thermoplastic resin fed therein with the compressed air is passed through air ring 3 and a cooling bath 4 to be cooled, thereafter, taken up by nip rolls 5, and delivered to the succeeding process. In this case, as the thermoplastic resin used in the invention, these may be listed crystalline resins such as polypropylene, polyethylene terephthalate, polyamide, EVOH, polyvinylidene chloride or multi-layer ones between these crystalline resins or other non-crystalline resins.

The air ring 3 is disposed directly beneath the die 2, for cooling by air the outer surface of the molten thermoplastic resin extruded in the tubular shape from the die 2. Furthermore, the cooling bath 4 is disposed downwardly of the air ring 3, and water is filled up in a water bath having a hole, through which the molten thermoplastic resin extruded from the die 2 is passed. With this arrangement, the molten thermoplastic resin extruded from the die 2 is cooled by air from the air ring 3, and thereafter, further cooled and solidified by the water-cooling effect of the cooling bath 4.

The tubular thermoplastic resin film delivered from the nip rolls 5 is passed through two guide rolls 6 and 7, thereafter, passed through top nip rolls 8 and bottom nip rolls 9, and taken up by a reeler, not shown, or the like for example. In this case, the bottom nip rolls 9 are larger in circumferential speed than the top nip rolls 8, and the compressed air is poured into the tubular film between the top nip rolls 8 and the bottom nip rolls 9, whereby, when the tubular film is heated to a temperature where the film can be stretched, the tubular film is simultaneously stretched in the longitudinal and transversal directions of the film through the both actions, i.e. an expansion force of the compressed air and a tensile force in the feeding direction of the film. In this case, stretching ratios during the stretching may be suitably determined in accordance with the types of the thermoplastic resin, and may be about 2.0–6.5 for example.

Provided between the top nip rolls 8 and the bottom nip rolls 9 is heating-stretching section 10 for heating the tubular film to the temperature where the film can be stretched. The heating-stretching section 10 is of such an arrangement that a heat source such for example as an infrared heater is annularly provided along the inner peripheral surface of a cylindrical member being opened at top and bottom ends. With this arrangement, the tubular film is heated at least to the temperature where the film can be stretched by radiant heat emitted mainly from the heat source.

Provided at the upstream side of the heating-stretching section 10, i.e. on the side of the nip rolls 8 is an air ring device 11 for blowing air against and about the stretching starting point in the heating-stretching zone of the tubular film at a predetermined angle relative to the feeding direction of the film. The air ring device 11 is constructed such that a plurality of air outlets, such as slits or small holes, are provided on the inner peripheral surface of an annular ring member. Because of this, air is uniformly blown against the tubular film in its circumferential direction. Furthermore, a blowout angle $\alpha$, at which the air is blown out, is set within an angular scope where the air blown out therefrom can smoothly flow from the stretching starting point, along the outer surface of the film and in the feeding direction of the film, i.e. within an angular scope of 20°–60°, preferably 30°–50°, relative to the feeding direction of the film. In this case, as the blown-out air, normally, air of room temperature or heated air may be used.

Further, provided at the upstream side of the air ring device 11, i.e. on the side of the top nip rolls 8 as necessary is a pre-heating section 12, which is not an indispensable part of the present invention. The preheating section 12 is similar in arrangement to the heating-stretching section 10, constructed such that an infrared heater or the like is provided on the inner peripheral surface of a cylindrical member.

On the other hand, provided at the downstream side of the heating-stretching section 10, i.e. on the side of the bottom nip rolls 9 are guide rollers 13 for successively flatly folding the tubular film, which has been stretched, and introducing the same to the bottom nip rolls 9. The plurality of guide rollers 13 are arranged in a V-shape so as to be progressively narrowed in width toward the bottom. With this arrangement, the tubular film, which has been stretched, is guided to the bottom nip rolls 9 while being successively flatly folded by the guide rollers 13, thereafter, thermally fixed as necessary and taken up by a reeler, not shown, for example.

Description will hereunder be given of action of this invention. Firstly, the molten thermoplastic resin extruded in the tubular shape from the die 2 by the extruder 1, while being expanded in the tubular shape by the compressed air poured into the resin, is successively cooled by the air rings 3 and the cooling bath 4 to be solidified in the tubular shape, thereafter, passed through the nip rolls 5 and the guide rolls 6 and 7, and delivered to the top nip rolls 8.

The tubular film delivered to the top nip rolls 8 is heated to the temperature where the film can be stretched, in the heating-stretching section 10. Then, the tubular film is simultaneously stretched in both the longitudinal and transversal directions of the film by the compressed air poured into the thermoplastic resin film between the top nip rolls 8 and the bottom nip rolls 9 and the difference in circumferential speed between the nip rolls 8 and 9.

At this time, air is blown against and about the stretching starting point in the heating-stretching zone of the tubular film from the air ring device 11. The air blown out of the air ring device 11 is blown against and about the stretching starting point of the tubular film, and thereafter, flows along the outer surface of the tubular film, whereby the surface of the film are covered by a fluidized air film. As the result, the temperature distribution at the stretching starting point becomes uniform in the circumferential direction of the tubular film, so that the stretching starting point can be stabilized at a constant position and the shaking of the film after the stretching can be prevented. Moreover, the air flowing along the outer surface of the tubular film cools the film, which has been passed through the stretching-orienting zone.

Thereafter, the tubular film, which has been stretched, is flatly folded by the guide rollers 13, and thereafter, taken up by the bottom nip rolls 9. The tubular film taken up by the bottom nip rolls 9 is thermally fixed as necessary, and thereafter, reeled.

In consequence, in this invention, air is blown against and about the stretching starting point of the heating-stretching zone of the tubular thermoplastic resin film at the angle of 20°–60° relative to the feeding direction of the film, so that the stability in the stretching operation can be improved.

In short, the air blown against and about the stretching starting point of the tubular film flows along the outer surface of the tubular film and the fluidized air film is formed on the surface of the film, so that the temperature distribution at the stretching starting point can be made uniform. Because of this, the stretching starting point can be stabilized at the constant position and the shaking of the film after the stretching can be prevented. In passing, when the blowout angle α from the air blow outlets is beyond the aforesaid angular scope, the air blown against the stretching starting point does not smoothly flow the outer surface of the tubular film, whereby it becomes difficult to form the uniformly fluidized air film on the surface of the film.

As the result, the biaxially oriented film having such excellent physical properties that the orientation balance is good and accuracy in uniform section is high can be obtained.

In the producing apparatus, there is needed only one air ring device 11 for blowing air against and about the stretching starting point at the predetermined angle relative to the feeding direction of the film, whereby, as compared with the conventional case where these are needed two air ring devices, the installation cost and the manufacturing cost are low, and moreover, the operational control can be easily performed.

Detailed description will be given on the embodiments.

First of all, description will be given of a first embodiment where polypropylene is subjected as the thermoplastic resin. In this case, using the apparatus shown in the drawing, homopolypropylene (density: 0.91 g/cm$^3$, melt index: 10 g/10 min, Trade name: Idemitsu Polypro F900B manufactured by Idemitsu Petrochemical Co., Ltd.) was extruded to provide a tubular polypropylene film having a diameter of 60 mm and a thickness of 120 micron meters. This tubular film was pre-heated by the pre-heating section 12, thereafter, introduced to the heating-stretching section 10 at a speed of 3 m/min, stretched to the size of about 4 times that of the original film in both the longitudinal and transversal directions of the film, to thereby obtain a simultaneously biaxially oriented polypropylene film. Additionally, the atmospheric temperature in the preheating section 12 is 140°–150° C., the atmospheric temperature in the heating-stretching section 10 is 230°–240° C., and an air stream of room temperature was blown at a flowrate of 10 m$^3$/min from the air ring device 11 mounted upwardly of the heating-stretching section 10, at an angle of 45° toward the stretcjing starting point.

As the result, the stretching starting point was stabilized at the constant position by the air ring device 11, and no shaking of the tubular film after the stretching occurred, whereby stabilized stretching operation was performed.

Description will hereunder be given of a second embodiment where polyamide is studied as the thermoplastic resin.

Polyamide resins used in this second embodiment include nylon 6, nylon 8, nylon 11, nylon 12, nylon 6-12, nylon 66, nylon 610 and so forth. As far as the gist of the present invention is not changed, polyamide resin used in this embodiment may be blended with any other thermoplastic resin, and further, added thereto with admixture or admixtures such as heat stabilizer, plasticizer, antistat and colorant. Further, the polyamide resin used in this embodiment may mold a multilayer film with any other crystalline thermoplastic resin or non-crystalline thermoplastic resin.

Stretching ratios in the second embodiment are determined, such for example that the stretching ratio in the feeding direction of the film is 2–4 and preferably 2.2–3.2, the stretching ratio in the transversal direction of the film is 2.2–4.5 and preferably 2.4–3.4, on condition that the difference in stretching ratio therebetween (stretching ratio in transversal direction) —(stretching ratio in longitudinal direction)) is 0—0.8. The difference in stretching ratio therebetween is preferably 0.1–0.7 and more preferably 0.1–0.5. Here, if each of the stretching ratios is less than 2, then the film is low in strength, while, if each of the stretching ratios exceeds 4.5, then the stretching becomes difficult to perform, thereby possibly causing a broken tube. Furthermore, if the difference in stretching ratio therebetween is beyond the above-described range, then the stretching starting point is not stabilized at the constant position, whereby the stretched bubble is gourd-shaped, so that the material quality is not stabilized, and moreover, the production itself becomes difficult to carry out.

Furthermore, the atmospheric temperature in the heating zone in the heating-stretching section 10 is 80°–200° C. and preferably 100°–170° C. As the result, the tubular film is heated at least to a temperature where the film can be stretched mainly by the radiant heat from the heat source. Additionally, the temperature of the film at the stretching ending point is 130° C. or less, and preferably 110° C. or less.

By use of the stretching ratios and the temperature range as described above, film stretching can be performed similarly to the first embodiment.

According to the second embodiment as described above, the stretching is performed under such required conditions that air is blown at the angle of 20°–60° relative to the feeding direction of the film, the stretching ratio in the feeding direction is 2–4 and the stretching ratio in the transversal direction is 2.2–4.5, the stretching ratio in the transversal direction is equal to the stretching ratio in the longitudinal direction or the difference in stretching ratio between the former and the latter is 0.8 or less, so that the stability in stretching operation of the polyamide resin can be improved.

Additionally, concerning the second embodiment, the above-described respects will be clarified on the basis of examples 1 to 3 where biaxially oriented films were produced under the following required conditions. In this case, polyamide resin having a mean molecular weight of 24,000 (nylon 6) was extruded from an annular die 2 having a diameter 50 mm, cooled and solidified by water bath of 40° C. in the cooling bath 4, and a substantially amorphous tubular film having a thickness 100 micron meter and a diameter of 60 mm was produced at a molding speed of 6 m/min. The non-oriented tubular film thus obtained was biaxially stretched by use of the stretching device, as shown, wherein the circumferential speed of the nip rolls 8 for the delivery was set at 6 m/min and the circumferential speed of the nip rolls 9 for the take-up was made faster than 6 m/min and compressed air was poured into the tube under a blow ratio of 3.2, and a film excellent in transparency stabilized for a long period of time was obtained. The heating conditions were as shown below.

*Heating-stretching section (infrared heater)
  Diameter: 350 mm, Height: 250 mm, Temperature: 300° C., Atmospheric temperature: 130°
*Air ring
  Inner diameter: 270 mm, Aperture of slit: 2 mm, Blowout angle: 45°, Blowout temperature 20° C., Wind flowrate: 10 m$^3$/min, Blowout direction: Stretching starting point
*Film temperature at stretching ending point: 90° C.

The film thus obtained was heat-setted at 180° C. for 10 sec, and the values of physical properties of the film thus heat-setted and the stretchability are shown in the following table.

TABLE

| | STRETCHING RATIO | | | TENSILE STRENGTH (BREAKAGE) MD/TD (kg/cm$^4$) |
|---|---|---|---|---|
| | LONGI-TUDINAL | TRANS-VERSAL | DIFFERENCE (LONGITUDINAL-TRANSVERSAL) | |
| EXAMPLE 1 | 3.0 | 3.2 | 0.2 | 1310/1410 |
| EXAMPLE 2 | 2.8 | 3.2 | 0.4 | 1230/1380 |
| EXAMPLE 3 | 2.6 | 3.2 | 0.6 | 1140/1750 |
| REFERENCE EXAMPLE 1 | 3.4 | 3.2 | −0.2 | 1670/1650 |
| EXAMPLE 2 | 2.2 | 3.2 | 1.0 | 995/2000 |
| COMPARATIVE EXAMPLE 1 | 3.0 | 3.2 | 0.2 | — |

| | ELASTIC MODULUS IN TENSION MD/TD (kg/cm$^2$) | IMPACT STRENGTH kg · cm/cm | BUBBLE TABILITY | ACCURACY IN UNIFORM SECTION ± % |
|---|---|---|---|---|
| EXAMPLE 1 | 32100/30000 | 8780 | EXCELLENT | 5 OR LESS |
| EXAMPLE 2 | 31200/29000 | 8610 | EXCELLENT | 5 OR LESS |
| EXAMPLE 3 | 30000/28100 | 8390 | EXCELLENT | 6 OR LESS |
| REFERENCE | 35000/34000 | 8500 | NO GOOD | 8~12 |
| EXAMPLE 2 | 32800/27800 | 8080 | NO GOOD | 10~14 |
| COMPARATIVE EXAMPLE 1 | — | — | BECAUSE OF GOURD-SHAPED BUBBLE, PRODUCT CANNOT BE COMMERCIALIZED | | |

Additionally, in the table, the required conditions in the reference examples 1 and 2 are similar to those in the example 1 except that the stretching ratio is changed. Furthermore, the required conditions in the comparative example 1 are similar to those in the example 1 except that the air ring is not used.

Description will hereunder be given of a third embodiment of the present invention, wherein the aforesaid EVOH is studied as the thermoplastic rensin. As the EVOH, there is used one having an ethylene content 25–60 mol % and a degree of saponification 95% or more. If the EVOH has an ethylene content and a degree of saponification beyond these scopes, it is not preferable in the respects of gas barrier properties, transparency and resistance to water. Furthermore, similarly to the second embodiment, an admixture or various admixtures may be added to the EVOH resin used in this embodiment or the EVOH resin may mold a multilayer film with any other resin. In this embodiment also, the air blowout angle from the air ring device is equal to those in the first and the second embodiments, however, the stretching ratios and the atmospheric temperature in the heating-stretching zone are different from those in the preceding embodiments.

Namely, the stretching ratios are suitably determined in accordance with the types of EVOH, however, the required condition is that at least the stretching ratio in the longitudinal direction is smaller in value than the stretching ratio in the transversal direction. This difference in stretching ratio therebetween, i.e. (stretching ratio in transversal direction)—(stretching ratio in longitudinal direction) is preferably 0.6–2.0 in particular.

stretching ratio due to internal pressure is set at 2.8, the atmospheric temperature around the stretching starting point is made to be 130° (temperature of the infrared heater: 350° C.) and air of 20° C. from the air ring device 11 (inner diameter: 270 mm, aperture of slit: 2 mm) provided upwardly of the heating section 10 is inwardly blown at an air flowrate of 10 m³/min against the stretching starting point at 45°. The circumferential speed of the nip rolls 9 for the take-up was varied accordingly, whereby a film having the stretching ratio in the longitudinal direction of 1.2 (example 4), 1.6 (example 5) and 2.0 (example 6) was obtained. The following table shows the stabilities and the states of uniform section in the examples 4, 5 and 6 together with reference example 3 and comparative example 2.

TABLE

|  | STRETCHING RATIO | | DIFFERENCE LONGITUDINAL-TRANSVERSAL | STABILITY OF BUBBLE | UNIFORM SECTION |
|---|---|---|---|---|---|
|  | LONGITUDINAL | TRANSVERSAL |  |  |  |
| EXAMPLE 4 | 1.2 | 2.8 | 1.6 | GOOD | GOOD |
| EXAMPLE 5 | 1.6 | 2.8 | 1.2 | GOOD | GOOD |
| EXAMPLE 6 | 2.0 | 2.8 | 0.8 | GOOD | GOOD |
| REFERENCE EXAMPLE 3 | 3.0 | 2.8 | −2.0 | BECOMING GOURD SHAPE AND BROKEN | — |
| COMPARATIVE EXAMPLE 2 | 1.2 | 2.8 | 1.6 | BECOMING GOURD SHAPE AND BROKEN | — |

Additionally, the stretching ratio in the longitudinal direction is normally 1.1–5.0, and preferably about 1.2–4.0. Furthermore, the atomspheric temperature in the heating-stretching zone is different in accordance with the melting points of EVOH to be stretched, and, normally, 70°–200° C., preferably 80°–170° C.

Additionally, in this embodiment, the blowout angle from the air ring device 11 is similar to that in the second embodiment.

In this embodiment, film molding can be performed within the range of the required conditions as described above, similarly to the preceding embodiments. In this case, the raw material film is rapidly cooled in the cooling bath 4 to be suppressed in crystallization as much as possible, and molded into one having a moisture containing value 2% or less.

According to the above-described third embodiment, the stretching is performed on condition that the stretching ratio in the longitudinal direction is smaller in value than the stretching ratio in the transversal direction, so that the stability in the stretching operation can be improved by a simplified method.

Moreover, the biaxially oriented film being satisfactory in accuracy in uniform section, excellent in resistance to water, strength and the like, and having a high material quality.

Concerning the third embodiment, the above-described respects will be clarified on the basis of examples where biaxially oriented films were produced under the following required conditions. In this case, a saponified material of ethylene-vinyl acetate copolymer (Trade name: Soanol ET(phonetic), manufactured by The Nippen Synthetic Chemical Industry Co., Ltd.) having an ethylene content of 38 mol % and a melting point 173° C. was extruded from a bottom blowoff water cooled extruder, water cooled and solidified and a substantially non-oriented tubular film having a diameter of 60 mm and a thickness of 100 microns meter was obtained. Subsequently, stretching operation was performed such that the stretching apparatus, as shown, is used, the circumferential speed of the nip rolls 8 for the delivery is set at 6 m/min, the lateral (widthwise)

In the above table, as for the required conditions in the reference example 3, the stretching was performed similarly to the example 4 except that the transversal stretching ratio was set at 2.8 and the longitudinal stretching ratio 3.0. Furthermore, as for the required conditions in the comparative example 2, the stretching was performed similarly to the example 4 except that no air ring device was used. As the result, neck stretching occurred in both the reference example 3 and the comparative examples 2, so that no satisfactory film was obtained.

As has been described hereinabove, the present invention can provide a method of producing the biaxially oriented film of thermoplastic resin, wherein the stability during the stretching operation is high and the physical properties of the film to be obtained are satisfactory. Furthermore, the present invention can provide the apparatus for producing the biaxially oriented film, wherein the installation cost and the production cost are low and the operational control is easily performed.

What is claimed is:

1. In a method of producing a biaxially oriented film of thermoplastic resin wherein a tubular thermoplastic resin film is fed into a heating zone and simultaneously stretched in both its longitudinal and transversal directions by a tensile force in the feeding direction and an internal pressure, the improvement comprising said thermoplastic resin being selected from the group consisting of a polyamide and a saponified material of an ethylene vinyl acetate copolymer and said tubular thermoplastic resin film being contacted by blowing air at room temperature against and about a stretching starting point in said heating zone so that the temperature distribution of said film is stabilized at the stretching starting point, said blowing air being supplied from an upstream side of said stretching starting point at a predetermined air blowout angle relative to the longitudinal direction of said film.

2. A method as set forth in claim 1, wherein said air blowout angle is within an angular scope of 20°–60° relative to the longitudinal direction of said film.

3. A method as set forth in claim 1, wherein said air blowout angle is within an angular scope of 30°–50° relative to the longitudinal direction of said film.

4. A method as set forth in claim 1, wherein stretching ratios in the longitudinal and transversal directions of said film is 2–4.5 and the stretching is performed on condition that a difference obtained by subtracting the stretching ratio in the longitudinal direction from the draw stretching in the transversal direction is 0–0.8.

5. A method as set forth in claim 4, wherein the stretching ratios in the longitudinal direction and the transversal direction of said film are 2.2–3.4.

6. A method as set forth in claim 4, wherein said difference in stretching ratio is 0.1–0.7.

7. A method as set forth in claim 4, wherein said difference in stretching ratio is 0.1–0.5.

8. A method as set forth in claim 4, wherein said thermoplastic resin is polyamide.

9. A method as set forth in claim 1, wherein atmospheric temperature in said heating-stretching zone is 80°–200°.

10. A method as set forth in claim 1, wherein the atmospheric temperature in said heating-stretching zone is 100°–170°.

11. A method as set forth in claim 1, wherein the stretching ratio in the longitudinal direction is smaller in value than the stretching ratio in the transversal direction.

12. A method as set forth in claim 11, wherein said difference in stretching ratio is 0.6–2.0.

13. A method as set forth in claim 11, wherein the stretching ratio in the longitudinal direction is 1.1–5.0.

14. A method as set forth in claim 11, wherein said thermoplastic resin is a saponified material of ethylenevinyl acetate copolymer.

15. A method as set forth in claim 11, wherein atmospheric temperature in said heating-stretching zone is 70°–200° C.

* * * * *